United States Patent [19]
Venolia

[11] Patent Number: 5,146,212
[45] Date of Patent: Sep. 8, 1992

[54] MANIPULATABLE ORIENTATION FOR A TRANSLATABLE GRAPHIC OBJECT

[75] Inventor: Daniel S. Venolia, Soquel, Calif.

[73] Assignee: Apple Computer, Inc., Cupertino, Calif.

[21] Appl. No.: 460,774

[22] Filed: Jan. 4, 1990

[51] Int. Cl.$^5$ .............................................. G09G 3/02
[52] U.S. Cl. ...................................... 340/709; 340/710
[58] Field of Search ................... 340/709, 710, 706; 364/521, 522

[56] References Cited

U.S. PATENT DOCUMENTS

| | | | |
|---|---|---|---|
| 4,766,423 | 8/1988 | Ono et al. | 340/709 |
| 4,791,478 | 12/1988 | Tredwell et al. | 340/709 |
| 4,812,829 | 3/1989 | Ebina et al. | 340/709 |
| 4,877,230 | 12/1989 | Noguchi et al. | 340/709 |

FOREIGN PATENT DOCUMENTS

0281054 9/1988 European Pat. Off. .

Primary Examiner—Ulysses Weldon
Assistant Examiner—Matthew Luu
Attorney, Agent, or Firm—Timothy D. Casey

[57] ABSTRACT

A method for changing the orientation of a graphic object in response to changes in the variable position of that object on the display of a computer is disclosed. The position of the graphic object on the display is determined by the position of a control point having a fixed position in relation to the object and a variable position in relation to the display. The control point is operative to change its position in response to translational signals received by an interactive control device, and the computer is operative to display the object at each position of the control point. A change in the orientation of the object to be displayed at the new position of the control point is determined by establishing a following point having a fixed position with respect to the object and a variable position with respect to the display, and tracking the variable position of the following point behind the path of the motion of the control point. The path of the control point is tracked by the following point by determining the direction and magnitude of change in a vector extending between the control point and the following point and then changing the variable position of the following point to normalize the magnitude of the vector in that direction of change.

12 Claims, 6 Drawing Sheets

MANIPULATABLE ORIENTATION FOR A TRANSLATABLE GRAPHIC OBJECT

FIELD OF THE INVENTION

The present invention relates generally to translatable images or graphic objects capable of being displayed on a computer screen, and more particularly to a method for changing the orientation of a graphic object in response to translational changes in the position of that graphic object on the computer screen.

BRIEF DESCRIPTION OF THE PRIOR ART

Many computer software applications allow a user to create an image or graphic object on the screen of a computer and manipulate the position of that image on the screen. When an image is created, the initial orientation of that image on the screen typically remains static despite changes in the image's position. Although some software applications allow a user to rotate the image about a selected fixed point, the user cannot simultaneously change the position and orientation of that image on the screen. The ability to control both the position and orientation of an image or graphic object on the screen would be a desirable feature in a number of special and standard software applications. For example, it would be advantageous in many applications to simultaneously control the orientation of a cursor on a computer screen, as well as its position.

A cursor is a visual marker displayed on the screen of a computer terminal to indicate a user's working position on the screen. Many computers or software programs are designed to be used with an interactive cursor control device, such as a mouse, joystick or trackball, so that the position of the cursor can be easily controlled without entering commands from a keyboard. The type of visual marker utilized for the cursor image varies depending on the purpose of the cursor or the particular software program for which it was designed. A typical two-dimensional cursor image is that of an arrow, having a point and a tail, and a typical three-dimensional cursor image is that of a polygonal cone. The actual working position is generally not the entire cursor, but rather a single predetermined working point in the cursor image, such as the end point of the arrow or the cone.

Figure 1:
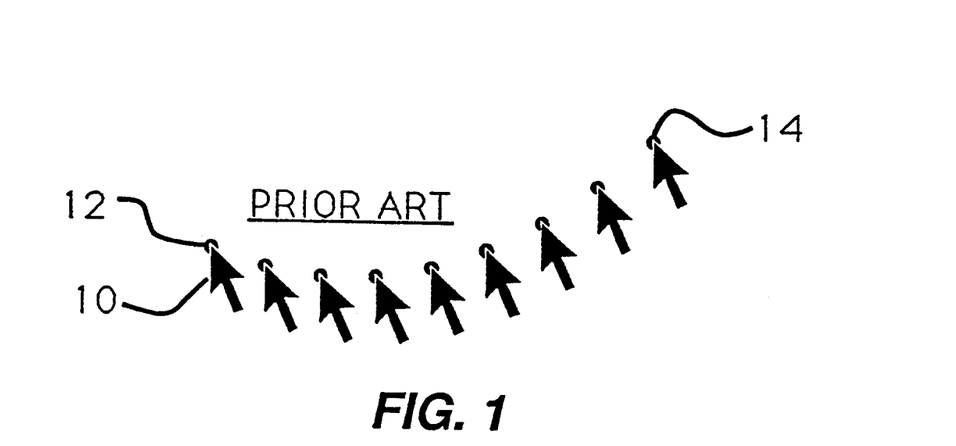
FIG. 1 is a prior art illustration of the position and static orientation of an interactively controlled cursor in accordance with prior art methods of cursor manipulation.

A two-dimensional cursor moves along the plane representing the face of the computer screen in response to translation signals received from a controller. Since it would be needlessly difficult to individually control the position of every coordinate point associated with the cursor via commands from the cursor control device, the control device only operates to control the screen position of a single working point associated with the cursor. One or more software programs typically operate to control the screen position of the remaining pixels of the cursor image in coordination with changes in the position of that working point. A three-dimensional cursor operates in the same manner as a two-dimensional cursor, except that the cursor appears to be able to move in a third dimension in response to input Z-coordinate values. As described above, even though a cursor may be able to move in two or three dimensions, the orientation of the cursor remains static because the software programs which change the position of the image in coordination with the working point are not designed to also change the orientation of that image. An illustration of a cursor being translated using static orientation cursor manipulation techniques is depicted in FIG. 1 of the drawing herein.

There are a number of disadvantages associated with utilizing a cursor having a static orientation: (1) the cursor does not move in a natural manner when translated across the screen; (2) small cursor movements (i.e., one pixel) can be difficult for a user to detect; (3) the cursor may obscure the user's area of interest on the screen during certain operations; and (4) the cursor may substantially disappear from view when moved to a position near the edge of the screen. This latter disadvantage results when the working point is positioned within the visible parameters of the screen but the cursor image is oriented out of the display's parameters.

SUMMARY OF THE INVENTION

A preferred embodiment of the present invention comprises a method for changing the orientation of a graphic object in response to changes in the variable position of that object on the display of a computer. The position of the graphic object on the display is determined by the position of a control point having a fixed position in relation to the object and a variable position in relation to the display. The control point is operative to change its position in response to translational signals received by an interactive control device, and the computer is operative to display the object at each position of the control point. A change in the orientation of the object to be displayed at the new position of the control point is determined by establishing a following point having a fixed position with respect to the object and a variable position with respect to the display, and tracking the variable position of the following point behind the path of the motion of the control point. The path of the control point is tracked by the following point by determining the direction and magnitude of change in a vector extending between the control point and the following point and then changing the variable position of the following point to normalize the magnitude of the vector in that direction of change.

These and other embodiments of the present invention will no doubt become apparent to those skilled in the art after having read the following detailed disclosure of a preferred embodiment which is illustrated in the several figures of the drawing.

DETAILED DESCRIPTION OF THE PREFERRED EMBODIMENT

Figure 2:
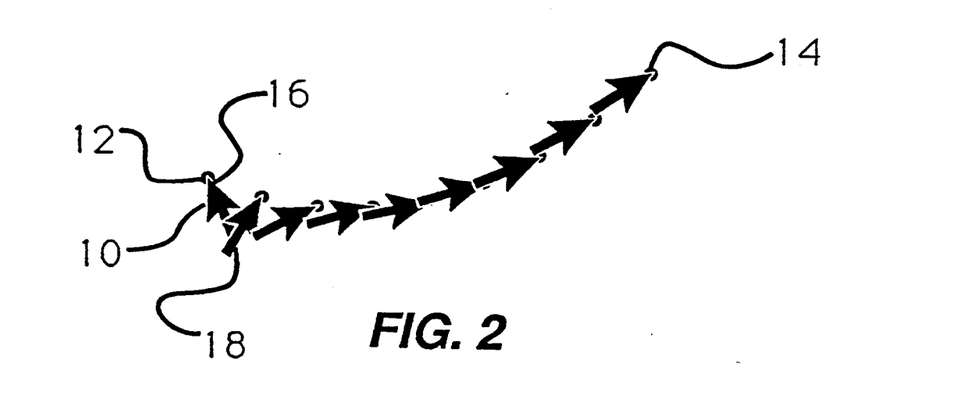
FIG. 2 is an illustration of the various positions and orientations of the cursor of FIG. 1 when manipulated in accordance with the preferred embodiment of the present invention.

FIG. 1 illustrates the appearance of a cursor image 10 when moved between a number of different positions on a computer screen using prior art methods of controlling the appearance of that cursor image. As cursor image 10 is moved from its starting position 12 to its ending position 14, its orientation in relation to the display over which it is moved remains static. In contrast, FIG. 2 illustrates how the same cursor image 10 would appear when moved through the same series of positions using the method of the preferred embodiment of the present invention. When the method of the present invention is applied to the cursor image 10, the cursor image 10 not only changes its position as it moves from starting position 12 to ending position 14, it also changes its orientation with respect to the screen in a manner which replicates a natural physical motion.

The manner in which the cursor image 10 changes its orientation, at least with respect to the cursor images depicted in FIG. 2, can be analogized to the movement of a board being dragged around on the ground by one of its ends. This concept is illustrated with respect to the cursor images depicted in FIG. 2, wherein the position of the working point 16 of the cursor image 10 is depicted as moving between the various positions depicted on the screen while dragging the tail 18 of the cursor image 10 behind it. This technique for manipulating the position and orientation of the cursor image is considered to replicate a natural physical motion because the motion of the cursor image models the motion of the dragging board.

Although the present invention is described in terms of its useful application to the control of a cursor image in combination with an interactive control device, the present technique is not limited to such usage alone. Virtually any image which can be created on a computer controlled screen, including a three dimensional image, can be manipulated in accordance with the present invention. For descriptive purposes, however, a majority of this description will be directed to the control of a cursor image, such as cursor image 10.

Figure 3A:
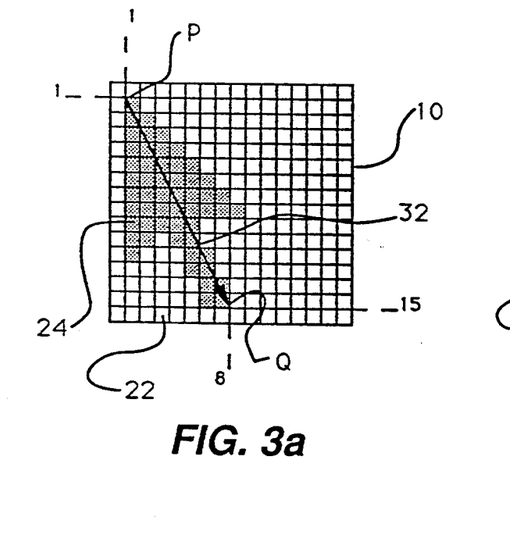
FIGS. 3a and 3b are illustrations depicting two cursor images and corresponding alignment vectors in accordance with the preferred embodiment of the present invention.
Figure 3B:
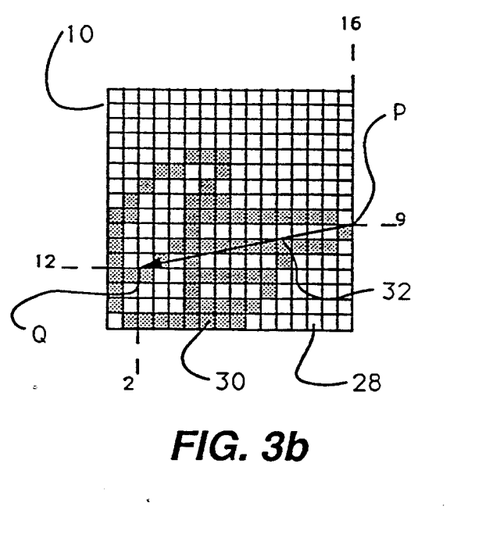

Cursor images can be created to appear in any of a number of different forms, such as the two illustrated in FIGS. 3a and 3b. For purposes of describing the present invention, the term cursor image is intended to apply to the entire cursor image, whether visible on the screen or not, while the term visual image is only intended to apply to the image or portion of an image which is generally visible to a user on the screen. Cursor images can be displayed on both vector and bit-mapped displays. The method for displaying the cursor images on the different types of screens varies slightly in a manner which is well known in the relevant art.

Bit-mapped cursor images are generally comprised of a mask field and a data field. The data field contains the visual image which will be displayed on the screen and the mask field contains the silhouette of the cursor image. As depicted in FIGS. 3a and 3b, the cursor images 10 appear on the screen as 16-by-16 pixel squares. The appearance of each pixel in a square is determined by the corresponding bits in the data field and the mask field.

The position of the cursor image 10 is generally controlled by the position of a single point (not a bit) associated with that image, known as the working point or control point, P, of the cursor. The coordinate position of a control point P in relation to the cursor image 10 is generally predetermined by the software application which generates that particular cursor image. The control point P need not be positioned within the cursor image 10, but typically is positioned within the area bounded by the mask field, since positioning the control point at a location outside of the mask field may result in an undesirable visual effect. For example, with reference to the image depicted in FIG. 3a, if the control point P is placed somewhere within the data field 24, its position will most likely allow visually direct control over changes in the orientation of the object in response to its translational changes. In contrast, if the control point P is placed at some position outside of the data field 24, the control point will no longer be directly associated with a visual portion of cursor image, thereby making the cursor less useful as a pointing tool, as it is utilized in many software applications.

Although the present invention incorporates the use and translation of cursor images created in the manner described above (a mask field, an image field, and a working point), it includes the additional feature of changing the orientation of that cursor image, as appropriate, in coordination with changes in the cursor image's position on the screen. Control over the orientation of the cursor image is achieved by establishing a second point relating to the cursor image, which is referred to as the following point Q. Both the control point P and the following point Q have fixed coordinate positions with respect to the cursor image, such as (1,1) and (8,15) respectively with respect to FIG. 3a, and variable coordinate positions with respect to the screen. Hence, the control point and the following point maintain relative positions with respect to the cursor image 10 as the cursor image changes its position on the screen. With regard to the control point, whenever the interactive control device is moved by a sufficient amount (or in response to any type of controller), a low-level routine is initiated which changes the control point's position on the screen so that it is aligned with the new location of the control device. The following point Q, however, is reactive to the motion of the control point P, rather than being directly controlled by signals from the interactive control device.

In terms of the present invention, the position of the following point Q is best selected as one which is likely to result in the most natural movement of the visual image depicted by the data field 24. Hence, if necessary, the following point Q may be selected as a point outside of the data field 24 or even the mask field 22 if a better visual effect would be achieved. For example, in FIG. 3a, the following point is selected as a point, not a bit, near the tail of the arrow because positioning the control point and following point in such locations provides a desired visual effect. In the pointing-hand cursor image 10 of FIG. 3b, another commonly used type of cursor image represented by a mask field 28 and a data field 30, the fixed coordinate position of the control point P (16,9) is selected near the end of the finger of the data field 30 and the fixed coordinate position of the following point Q (12,2) is positioned near the detached wrist of the hand. The position of both of these points in relation to the pointing-hand image are selected to result in the most natural movement of the cursor image 10 when it is moved across the screen in response to changes in the position of the control point P.

Although it is conceivable that the orientation of the cursor image could be controlled by recalculating the coordinate positions of all or a number of the points within the cursor image, and then calculating the degree of angular displacement with respect to the screen coordinate system for each translational movement of the control point, the preferred embodiment of the present invention operates to effectively reduce the image to a single more easily controlled vector. The coordinate positions of the control point P and the following point Q are fixed with respect to the cursor image and thereby form the fixed magnitude vector 32, depicted in both FIGS. 3a and 3b. When the control point P of the cursor image is moved to a new position on the screen by a controller, the vector 32 also moves. By tracking changes in the orientation of this vector as the control point is moved from position to position on the screen, it is possible to determine appropriate changes in the orientation of the cursor image which are required to create the desired visual effect of a dragging cursor.

Figure 4:
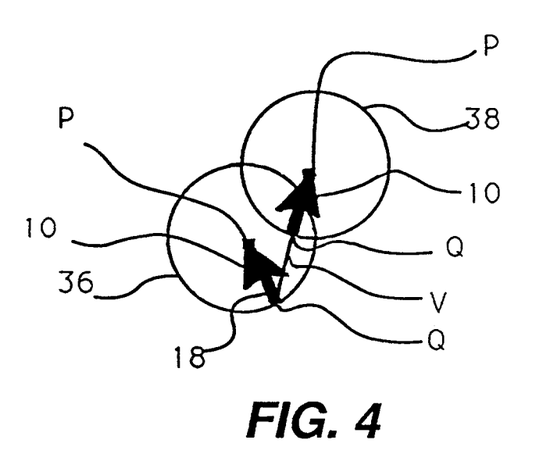
FIG. 4 is an illustration depicting the change in position of a two-dimensional cursor image and the corresponding change in the orientation of that image in accordance with the preferred embodiment of the present invention.
Figure 5:
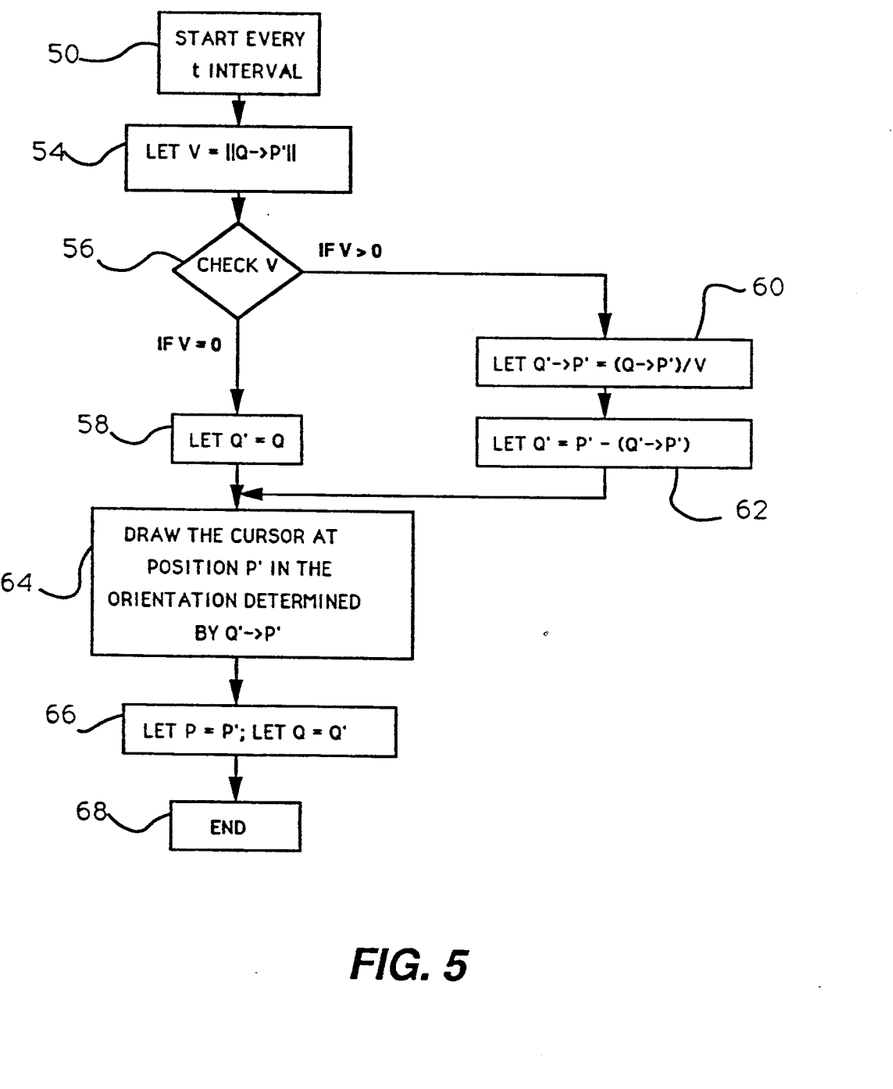
FIG. 5 is a block diagram illustrating the sequence of steps utilized by the present invention to determine the orientation of the cursor image in response to the translational motion depicted in FIG. 4.

Referring now to FIGS. 4 and 5, the method for determining an appropriate change in the orientation of a graphic object in response to changes in that object's position is described. FIG. 4 illustrates a change in the position of the cursor image 10 and the corresponding change in the orientation of that cursor image as determined in accordance with the present invention. FIG. 5 illustrates the sequence of steps which are utilized to determine the orientation of the cursor image in response to the translational motion depicted in FIG. 4. With reference to FIG. 4, the old position of the cursor image 10 is depicted as the area encircled by the line 36 and the new position of the cursor image 10 is depicted as the area encircled by the line 38. It should be remembered that the true screen position of the cursor image, at least with regard to the working point of the cursor image 10, is that of the control point P or P', and not the cursor image 10 itself. Hence, the positions of the cursor images 10 in FIG. 4 are depicted as circular areas to emphasize that the tail portion 18 of the cursor image 10 can be positioned at any point along the lines 36 or 38 without effecting the translational position of the control point P.

When the control point P is moved from the area of the old position 36 to the area of the new position 38, the coordinate values corresponding to the orientation of the vector Q→P at the old position 36 are stored in the memory of the computerized system which drives the display terminal. These stored values are then used in combination with the coordinate values corresponding to the position of the new control point P' to calculate the coordinate values for the new orientation of the vector Q'→P'. In general terms, the position and orientation of the vector Q'→P' is calculated by (1) determining the change in the direction and the magnitude of a reoriented vector V, extending from the position of the following point Q to the position of the new control point P', and (2) normalizing the magnitude of that reoriented vector V at its new orientation to the magnitude of the old vector Q→P. Normalizing the reoriented vector V, creates the normalized vector Q'→P', about which the cursor image 10 can be displayed, thereby indicating its new position and orientation. This process of changing the orientation of the cursor image is referred to as "dragging the cursor" because the visual images produced as a result of this process are similar to those of a board being dragged on the ground, as described above.

Referring now to the sequence of steps illustrated in FIG. 5, the process for reorienting the cursor image 10 is further demonstrated. The process is illustrated as being initiated at regularly timed intervals, as indicated by the block 50, "START EVERY t INTERVAL", although it could also be initiated whenever a change in the coordinate position of the control point was initiated by the controller (not shown, i.e., a mouse or computer program). The first step after starting this process is to measure the magnitude of the reoriented vector V, between the following point Q and the new control point P'. Hence, block 54 defines the reoriented vector V as the magnitude of the vector Q→P'.

After the Vector V has been defined, block 56 checks the magnitude of the reoriented vector V to determine if that magnitude exceeds zero. Block 56 is a necessary step in accordance with the embodiment depicted in FIG. 5 because the process of normalizing the reoriented vector V involves division by the magnitude of V, which would result in a system error in many computers if V was equal to zero. Since the magnitude of the vector V would only equal zero when the the control point P' is moved to the exact position of the following point Q, no change in the orientation of the vector Q'→P' would be required and its new position would be determined by simply changing Q' to equal Q, as shown in block 58.

If V is greater than zero, the process moves to block 60 instead of block 58, so that the reoriented vector V could be normalized at its new position and orientation. In block 60, the reoriented vector is normalized to its new orientation by application of the equation $$Q' \rightarrow P' = (Q \rightarrow P')/V$$

and in block 62 the new position of Q' is determined by application of the equation $$Q' = P' - (Q' \rightarrow P')$$

After determining the new positions for the following point Q', the cursor image 10 is redisplayed on the screen to match the position and orientation of the vector Q'→P', as indicated in block 64. After redrawing the cursor at its new position and orientation, the coordinate values for the new control point P' and the new following point Q' are let to become the old control point P and the old following point Q for the next interval of the process, as shown in block 66. Once the old positions of the control point and following point are established, the reorientation process is terminated, as shown in block 68.

Figure 6:
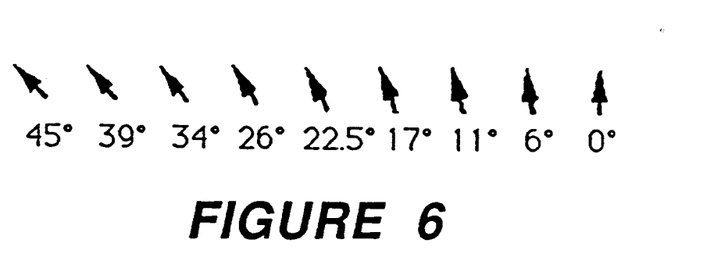
FIG. 6 is an illustration depicting various cursor orientations which can be stored in memory and used in accordance with the present invention.

Although it would be possible to calculate the coordinate values of the new following point Q' in real time during each interval involving a change in the coordinate position of the control point, it would be much easier to do these calculations in advance and store them in look-up tables. It would also be much easier to place the data required to create a cursor image at its various orientations in look-up tables as well. Accordingly, FIG. 6 illustrates a cursor image in a number of different orientations which can be utilized to create the visual image of a tail-dragging cursor in accordance with the present invention. Hence, instead of performing the calculations required to normalize the reoriented vector during each interval of the process, a look-up table is utilized to determine a normalized vector for each of the various possible unnormalized vectors. Another table has a list of the various cursor orientations which adequately replicate the desired cursor motion for that particular type of visual image. For example, FIG. 6 only illustrates cursor images oriented at 0, 6, 11, 17, 22.5, 26, 34, 39 and 45 degrees because these orientations were found to work best with display of the particular arrow image depicted. It should also be noted that it is not necessary to create a look-up table which includes the data for the various cursor image orientations in each octant of the screen's reference system. Rather, only one set of orientations for the cursor image in one octant is needed because the remaining orientations in other octants can be calculated by reflecting the data representing those images into the respective octants of the coordinate system.

It should be noted that the type of calculations required to reorient the vector, normalize the reoriented vector (with or without look-up tables), and determine and display the reoriented cursor image (with or without look-up tables) should be easily understood by a person of ordinary skill in the art and do not require a more complete description for the purposes of adequately describing the present invention. It should also be noted that although the present invention is useful for controlling the pitch and yaw of a three-dimensional cursor image, such as a polygonal cone, this technique only creates the appearance of inducing roll in a three-dimensional object. In order to control roll in a three-dimensional object subject to reorientation in accordance with the present invention, it is necessary to implement a technique similar to that described below and illustrated in FIGS. 7 and 8.

Figure 7:
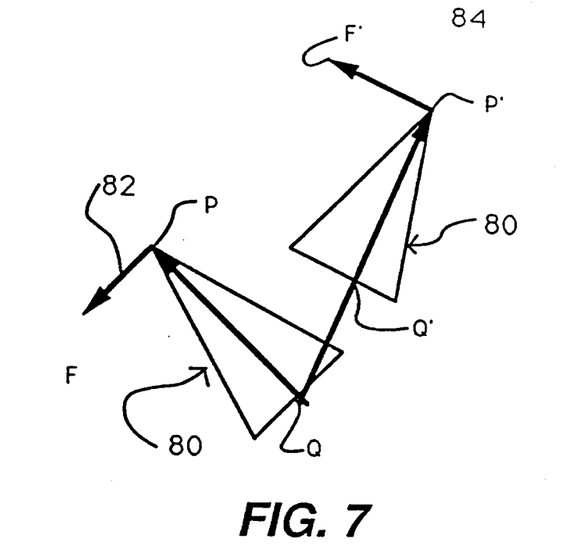
FIG. 7 is an illustration depicting a three-dimensional cursor image and a corresponding change in the orientation of that image in accordance with the preferred embodiment of the present invention.

Referring now to FIG. 7, a three dimensional object 80 (for illustrative purposes, shown as a cross-section through the plane defined by the points P, Q and P') is depicted as having a first position designated by the position of control point P and a first orientation designated by the orientation of a bore vector (Q→P), and as having a second position designated by the position of a new control point P' and a new orientation designated by the orientation of a new bore vector (Q'→P'). Once the new positions and orientations of the object 80 for a particular move have been determined (but not displayed on the screen), in accordance with the manner described above, a fin vector (P→F) 82 in the plane (P,Q,P') and perpendicular to the direction of the bore vector (Q→P) is established. A new fin vector (P'→F') 84, which is in the plane (P,Q,P') and perpendicular to the new bore vector (Q'→P') is also established. The position and orientation of these fin vectors 82 and 84, in relation to the three-dimensional object being rolled, are then transformed back to the origin of the coordinate system of the screen, in order to determine the angle 0 by which the object must be rotated in order to replicate the angular displacement between the old fin vector 82 and the new fin vector 84.

Figure 8:
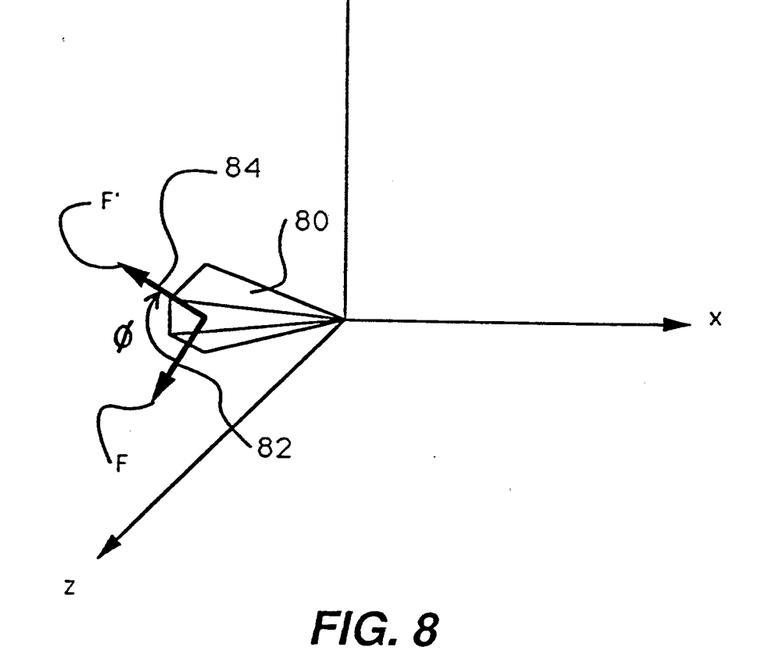
FIG. 8 is an illustration depicting the angular relationship between the vectors depicted in FIG. 7.

Referring now to FIG. 8, the transformed vectors 82 and 84 are shown in relation to the origin of the coordinate system of the screen and the object 80 (shown in three-dimensional form). Both the old bore vector 82 and the new bore vector 84 are oriented so as to start from the X-axis and travel along a plane perpendicular to that axis. Rotating the new vector 84 to match the old vector 82 determines the angle 0 and makes it possible to determine the view of the graphic object 80 which will most likely create the desired visual effect.

Although the present invention has been described with reference to FIGS. 1-8 and with emphasis on manipulation of a cursor image, it should be understood that the figures are for illustration only and should not be taken as limitations upon the invention. It is contemplated that many changes and modifications may be made, by one of ordinary skill in the art, to the process and arrangement of steps of the process of the invention without departing from the spirit and scope of the invention as disclosed above.

I claim:

1. A method for changing the orientation of a graphic object having a variable position on a display of a computer, the graphic object including a control point having a fixed position with respect to the graphic object and having a variable position with respect to the display, the control point being operative to change its variable position in response to signals from a controller, the computer being operative to display the graphic object at a specific orientation on the display in response to changes in the variable position of the control point; comprising the steps of:

selecting a following point having a fixed position with respect to the graphic object and having a variable position with respect to the display;

changing the variable position of the following point in response to changes in the variable position of the control point in such a manner so as to cause the variable position of the following point to track a path of varying orientation behind the motion of the control point, said step of changing including the steps of determining the direction and magnitude of change in the variable position of the control point by measuring the direction and normalized magnitude of a first vector between a first variable position of the control point and a first variable position of the following point and by measuring the direction and magnitude of a new vector between a new variable position of the control point and the first variable position of the following point, and moving the variable position of the following point to match the direction and magnitude of change in the variable position of the control point; and displaying the graphic object at a new orientation on the display that matches the variable positions of the control point and the following point.

2. A method for changing the orientation of a graphic object as recited in claim 1, wherein the step of moving the variable position of the following point includes the step of changing the magnitude of the new vector to match the normalized magnitude of the first vector by changing the variable position of the following point to a new variable position in the direction of the new vector.

3. A method for changing the orientation of a graphic object as recited in claim 1, wherein the graphic object is a two-dimensional image.

4. A method for changing the orientation of a graphic object as recited in claim 3, wherein the two-dimensional image is a cursor image including a data field and a mask field, wherein the fixed position of the control point is within the data field and near a visual working point of the cursor image, and wherein the fixed position of the following point is selected outside of the mask field.

5. A method for changing the orientation of a three-dimensional graphic object having a variable position on a display of a computer corresponding to a three-dimensional coordinate system, the graphic object including a control point having a fixed position with respect to the graphic object and having a variable position with respect to the display, the control point being operative to change its variable position in response to signals from a controller, the computer being operative to display the graphic object at a specific orientation on the display in response to changes in the variable position of the control point; comprising the steps of:

selecting a following point having a fixed position with respect to the graphic object and having a variable position with respect to the display;

changing the variable position of the following point in response to changes in the variable position of the control point in such a manner so as to cause the variable position of the following point to track a path of varying yaw and pitch behind the motion of the control point, the changing step includes the steps of determining the direction and magnitude of change in the variable position of the control point by measuring the direction and normalized magnitude of a first vector between a first variable position of the control point and a first variable position of the following point and by measuring the direction and magnitude of a new vector between a new variable position of the control point and the first variable position of the following point, and moving the variable position of the following point to match the direction and magnitude of change in the variable position of the control point; and displaying the graphic object at a new orientation on the display that matches the variable positions of the control point and the following point.

6. A method for changing the orientation of a graphic object as recited in claim 5, wherein the step of moving the variable position of the following point includes the step of changing the magnitude of the new vector to match the normalized magnitude of the first vector by changing the variable position of the following point to a new variable position in the direction of the new vector.

7. A method for changing the orientation of a graphic object as recited in claim 6, wherein the step of displaying the graphic object includes the steps of:

establishing a first fin vector within a plane perpendicular to the direction of the first vector;

establishing a new fin vector within a new plane perpendicular to the direction of the new vector;

transforming the first fin vector and the new fin vector to the origin of and within a base plane perpendicular to the three-dimensional coordinate system of the display; and displaying the graphic object at a new orientation on the display that matches the variable positions of the control point and the following point while simultaneously displaying a rolled image of the graphic object that aligns the direction of the new fin vector with the direction of the first fin vector.

8. A method for providing rotational motion to the translational motion of a graphic object displayed on a computer screen, the graphic object having a variable screen position, the graphic object also including a control point having a fixed coordinate position relative to the graphic object and a variable coordinate position relative to the computer screen, the control point being operative to change its variable coordinate position relative to the screen in coordination with the screen position of the graphic object and in response to signals from a controller, comprising the steps of:

(a) determining an initial coordinate position for said control point and an initial coordinate position for a following point, said following point being located a predetermined distance from said control point and having a variable coordinate position relative to the screen;

(b) displaying said graphic object at an initial screen position and an initial screen orientation relative to said initial coordinate positions for said control point and said following point;

(c) calculating a new coordinate position for said control point in response to said signals from said controller, determining the direction and magnitude of change between said new coordinate position for said control point and said initial coordinate position for said control point by measuring the direction and normalized magnitude of a first vector between the initial coordinate position of the control point and the initial coordinate position of the following point and by measuring the direction and magnitude of a new vector between the new coordinate position of the control point and the initial coordinate position of the following point, and calculating a new coordinate position for said following point which matches the direction and magnitude of change between said new coordinate position for said control point and said initial coordinate position of said control point;

(d) determining a new screen position for said graphic object in response to at least each change in the coordinate position of said control point;

(e) determining a new screen orientation for said graphic object in response to at least a change in the angular relationship between said initial coordinate positions for said control point and said following point and said new coordinate positions for said control point and said following point; and (f) displaying said graphic object at said new screen position and either at said new screen orientation or at said initial screen orientation as determined in step (e), whereby translational signals from said controller are operative to produce rotational motion in the appearance of said graphic object.

9. A method for providing rotational motion to the translational motion of a graphic object as recited in claim 8, wherein the step of calculating a new coordinate position for said following point includes the step of determining said new coordinate position for said following point by changing the magnitude of said new vector to match the normalized magnitude of said first vector.

10. A method for providing orientation to a graphic object displayed on a computer screen, the graphic object having a variable screen position, the graphic object also including a control point having a fixed position relative to the graphic object and a variable position relative to the computer screen, the control point being operative to change its variable position in coordination with the screen position of the graphic object in response to signals from a controller, comprising the steps of:

(a) determining an initial position for said control point and an initial position for a following point, said following point being located a predetermined distance from said control point and having a fixed position relative to the graphic object and a variable position relative to the screen;

(b) displaying said graphic object at an initial screen position and an initial screen orientation relative to said initial positions for said control point and said following point;

(c) calculating a new position for said control point in response to said signals from said controller, determining the direction and magnitude of change between said new position and said initial position for said control point by measuring the direction and normalized magnitude of a first vector between the initial position of the control point and the initial position of the following point and by measuring the direction and magnitude of a new vector between the new position of the control point and the initial position of the following point, and calculating a new position for said following point which matches the direction and magnitude of change between the initial and new positions of said control point;

(d) determining a new screen position for said graphic object in response to at least each change in the position of said control point;

(e) determining a new screen orientation for said graphic object in response to at least a change in the angular relationship between said initial positions for said control point and said following point and said new positions for said control point and said following point; and (f) displaying said graphic object at said new screen position and either at said new screen orientation or at said initial screen orientation as determined in step (e), whereby translational signals from said controller are operative to produce rotational motion in the appearance of said graphic object.

11. A method for providing orientation to a graphic object displayed on a computer screen as recited in claim 10, wherein the step of calculating a new position for said following point includes the step of determining said new position for said following point by changing the magnitude of the new vector to match the normalized magnitude of the first vector.

12. A method for providing orientation to a graphic object displayed on a computer screen as recited in claim 10, wherein the graphic object is a cursor image.

* * * * *